Patented Oct. 8, 1946

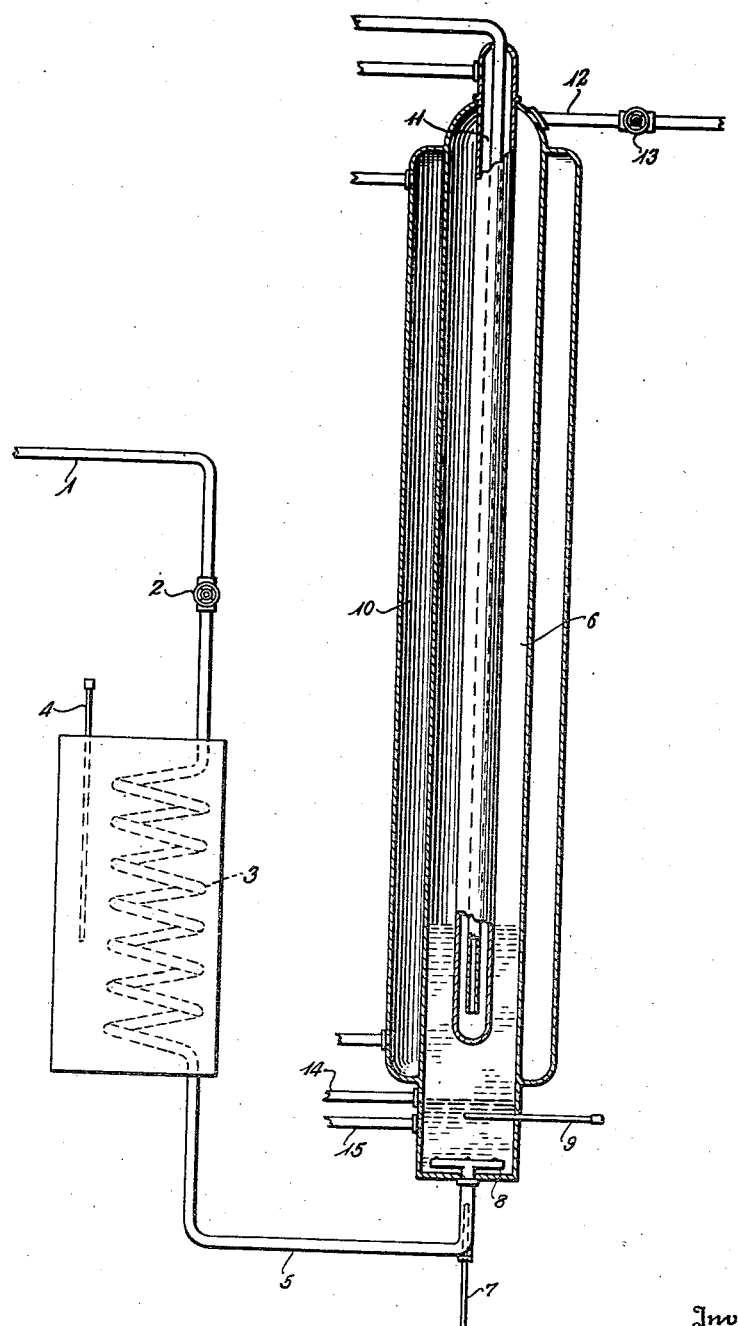

2,409,090

UNITED STATES PATENT OFFICE 2,409,090

ETHYLENE ALKYLATION

Robert E. Woodward, Westville, and Wendell P. Hawthorne, Wenonah, N. J., and Jacob R. Meadow, Memphis, Tenn., assignors to Socony-Vacuum Oil Company, Incorporated, a corporation of New York Application November 29, 1944, Serial No. 565,787

8 Claims. (Cl. 260—683.4)

This invention relates to a process for catalytic alkylation of isoparaffins by reaction with ethylene in the presence of liquid hydrogen fluoride. Alkylation of isoparaffins with olefins in general has become a widely practised method of synthesizing hydrocarbons in the motor fuel range but only the olefins of more than two carbon atoms have found commercial acceptance in catalytic processes of this type.

The valuable nature of possible alkylation products from ethylene is recognized, but the olefin is so difficult to react that commercial processes invariably use the higher boiling unsaturates. For example, diisopropyl (2,3 dimethyl butane) is an unusually good anti-knock component and its synthesis has been reported by reaction of ethylene and isobutane in the presence of aluminum chloride. Reaction of ethylene with isobutane has also been reported to occur under the high temperature and high pressure conditions of thermal alkylation, but the thermal product of simple alkylation is primarily neohexane. Various modifications of known alkylation catalysts, for example addition of activators to sulfuric acid and hydrogen fluoride, have been described with the broad comment that the new catalysts may be used for alkylation with olefins in general. None of these suggestions has led to a commercial process for catalytic alkylation with ethylene.

We have now found that isoparaffins may be readily alkylated with ethylene to afford good yields of synthetic products suitable for high grade motor fuel by modifications of the process of application Serial No. 481,430, filed April 1, 1943, by Arlie A. O'Kelly and Harry G. Doherty. According to the process of that application, mixed vapors of olefin and isoparaffin are introduced to a body of liquid hydrogen fluoride to induce alkylation. The present process applies that principle to ethylene alkylation by preheating of the charge vapors to within the range 400° to 1000° F. and maintaining the body of hydrogen fluoride at 100° to 200° F. This concept of preheating is disclosed and claimed for alkylation in general in application Serial No. 490,487 filed June 11, 1943, by Jacob R. Meadow and Arlie A. O'Kelly. The present invention differs from that of the latter application in that alkylation with ethylene requires temperatures (both charge preheat and catalyst) higher than those found desirable for other olefins.

The pressure in the reaction zone is adjusted to maintain a liquid body of hydrogen fluoride therein but may be sufficiently low to permit substantial evaporation of the acid catalyst for cooling thereof. In such case, the hydrogen fluoride is separated from gaseous hydrocarbons (principally unreacted charge containing an amount of alkylate depending on the temperature and pressure) and condensed liquid hydrogen fluoride is returned to the body of catalyst in the reaction zone. The pressure on the charge may be any desired value sufficiently greater than the reaction zone pressure to afford the desired rate of flow of charge through a device for introducing the charge, e. g., an atomizer.

In connection with olefins of more than two carbon atoms, the atomizing introduction of charge and preheating of the charge are advantageous primarily because of the greater specificity of reaction so obtained. With ethylene, however, introduction of a heated, vaporized charge into a bed of liquid hydrofluoric acid is necessary to cause reaction to occur at all. In addition, the present method results predominantly in a single reaction with diisopropyl as a major product. It appears that this is the only known means by which ethylene can be used as an alkylating agent for isoparaffins in the presence of a catalyst consisting substantially of liquid hydrogen fluoride. The process converts substantially all ethylene charged to alkyl fluoride or alkylate in a single pass if suitable conditions of temperature and pressure are employed. A saturated alkylation product is obtained and the ethyl fluoride may be recycled to the charge; with or without splitting to ethylene and hydrogen fluoride, to effect further alkylation of isobutane.

An arrangement of equipment which may be used to practice the essential features of the process of this invention is presented diagrammatically in the drawing. The mixture of isobutane and ethylene (which may contain hydrogen fluoride and/or ethyl fluoride) is pumped into the unit through line 1 and valve 2. The mixture is vaporized and adjusted to the desired temperature in a coil 3. (The temperature of the heating medium may be read at thermocouple 4.) Vaporized charge passes through a transfer line 5 to tower 6 which contains a bed of liquid hydrofluoric acid. Thermocouple 7 may be used to measure the temperature of the stream just before it enters the alkylation tower. At the base of the tower the entering stream passes through an atomizing plate or other distributing device 8 to disperse the charge in the bed of acid. The temperature of the acid layer may be read at thermocouple 9. The temperature is reduced sufficiently in the tower so that complete or partial condensation occurs. Some cooling arrangement is provided in the tower to remove sensible heat in the charge, heat of condensation, and heat of alkylation. In the sketch of the drawing cooling is provided with a cold jacket 10 and a cold finger 11. Other cooling methods could be used. Since condensation occurs in the tower, a layer of liquid hydrocarbon accumulates on top of the acid layer and flows out through line 12. Valve 13 is adjusted to maintain the desired pressure on the whole system. Product from valve 13 is processed for removal of dissolved hydrofluoric acid and is stabilized to separate product from unconverted reactants. Acid may be added to or removed from the tower by lines 14 and 15 as regeneration or replacement of the catalyst is required. It is evident that many modifications of this arrangement of equipment may be desirable for commercial, continuous application of the process. For example, cooling of the bed of catalyst may be accomplished by evaporation of hydrogen fluoride and/or other liquid in the tower.

A group of experiments has been completed with use of a unit similar to that outlined in the drawing. The results are reported in the examples below. In the laboratory, unit coil 3 was immersed in a lead bath and the temperature of the bath was determined at point 4. Transfer line 5 was insulated and also electrically heated to prevent excessive temperature drop before the charge reached the tower. Thermocouple 7 was about two inches below the distributing plate. In some cases the distributing device consisted of a steel plate bearing three holes of 0.024" diameter. In other cases the plate contained but one hole of 0.024" diameter. The tower was a piece of 2" iron pipe about thirty inches long and the HF charge for each run consisted of about two pounds of new, anhydrous hydrofluoric acid. In the experiments of the examples, the product from valve 13 was scrubbed for HF removal and was then stabilized and analyzed.

*Example 1.*—An isobutane-ethylene mixture containing 14.9 mol% ethylene was vaporized and charged through the one-hole plate at 797° F. at the rate of 72.7 cc. (liquid charge) per minute into liquid hydrogen fluoride at 151° F. and 1000 pounds per square inch gage. The product from a total charge of 4070 grams was 229 grams of debutanized alkylate containing 61.1 vol. % boiling 44° to 64° C. The hexane content of the alkylate was found to be as follows:

| | Weight per cent |
|---|---|
| Neohexane | 4.6 |
| Diisopropyl | 51.5 |
| 2-methyl pentane | 2.0 |
| 3-methyl pentane | 2.4 |

The ethylene charged underwent complete conversion of which 60% was converted to ethyl fluoride suitable for recycling to the process. The alkylate was completely saturated.

*Example 2.*—Charging 3180 grams of isobutane-ethylene vapor containing 13.1 mol% of olefin produced 496 grams of debutanized alkylate when vapors which had been heated in a lead bath at 1030° F. were introduced to acid in the tower at 170° F. and 600 pounds at a liquid feed rate of 56.7 cc./min. (3-hole atomizer plate). This represents a yield of 230% based on the ethylene charged. Under these conditions the yield of diisopropyl is 11.3% of the debutanized alkylate, which was completely saturated.

*Example 3.*—A total of 4520 grams of isobutane-ethylene mixture was vaporized and injected through the 1-hole plate at 937° F. and a liquid feed rate of 69.6 cc./min. into the acid catalyst maintained at 151° F. and 1000 pounds pressure. The ethylene constituted about 14.5 mol% of the charge. The debutanized alkylate, in the amount of 374 grams, was found to contain 27.6% diisopropyl.

*Example 4.*—Using the one-hole plate in a tower maintained at 152° F. and 1000 pounds pressure, a feed containing isobutane and 11.0 mol% ethylene was charged at 681° F. and a feed rate of 67.8 cc./min. The debutanized alkylate contained 35.6% diisopropyl.

*Example 5.*—At tower conditions of 152° F. and 1000 pounds, 95 grams of debutanized alkylate were obtained from 3835 grams of charge (15.1 mol% ethylene) at 715° F. The feed rate was rather high; 80.6 cc. liquid feed per minute being atomized through the one-hole plate. It was noted that 14% of the ethylene charge was recovered unconverted.

*Example 6.*—An isobutane-ethylene feed containing 13.1 mol% ethylene was introduced at 555° F., 43.1 cc./min., through the one-hole plate to hydrogen fluoride in the tower at 158° F. and 600 pounds pressure. The debutanized alkylate contained 20.7% diisopropyl.

*Example 7.*—A feed containing 13.0 mol% ethylene with isobutane was introduced at 773° F. and 68.7 cc./min. through the one-hole plate to hydrogen fluoride at 201° F. and 1000 pounds pressure. The debutanized alkylate contained 27% diisopropyl.

*Example 8.*—The acid in the tower was maintained at 203° F. and 1000 pounds pressure. An isobutane-ethylene feed containing 13.3 mol% ethylene was heated to 725° F. and pumped at the liquid rate of 68.0 cc./min. through the one-hole atomizer into the acid catalyst. The saturated alkylate, after stabilizing to remove butanes, contained 29.5% of diisopropyl.

*Example 9.*—Examples 1, 7 and 8, together with the present example show the change in nature of the product with temperature of the catalyst. The charge, at 799° F., was passed at 72 cc./min. through the one-hole plate into a catalyst body at 175° F. and 1000 pounds pressure. The debutanized alkylate (completely saturated) contained 45.7% diisopropyl.

*Example 10.*—As the catalyst temperature is decreased below the level of Example 1, the quality of the alkylate falls off. At catalyst temperature of 129° F., pressure of 1000 pounds, the alkylate contained 29.8% diisopropyl and contained some unsaturates. The feed in this run contained 13.0 mol% ethylene and was supplied through the one-hole atomizer at 761° F. and a liquid rate of 69.1 cc./min.

*Example 11.*—A run conducted at the minimum catalyst temperature contemplated by the invention gave a relatively low yield of 12.8% debutanized alkylate, based on ethylene charged. The catalyst temperature was 100° F. and the pressure in the tower was 1000 pounds. The isobutane-ethylene charge (14.5 mol% olefin) was introduced through the one-hole plate at a liquid rate of 68.6 cc./min. and a temperature of 801° F.

*Example 12.*—Isobutane-ethylene feed (17.2 mol% ethylene) at 618° F. was charged at 61.7 liquid cc./min. through the three-hole atomizer into liquid hydrogen fluoride at 195° F. and 1000 pounds pressure. The alkylate contained 27.6% by weight of diisopropyl.

*Example 13.*—The hydrogen fluoride was maintained at 186° F. and 600 pounds. A charge containing 12.2 mol% ethylene was introduced to the catalyst through the three-hole atomizer plate at 622° F. and 65 cc./min. The product contained 33.6% diisopropyl.

*Example 14.*—The charge was made up to contain 17.2 mol% ethylene and admitted to a hydrogen fluoride catalyst maintained at 168° F. and 1000 pounds pressure through the three-hole atomizer plate. The charge temperature was 605° F. Under these conditions 84.2 wt.% of product (based on ethylene charged) was obtained, of which 45.4% boiled in the hexane range and 26% in the octane range.

When the tower temperature is held at 150° F. and the charge temperature is raised, the yield of alkylate rises regularly from a negligible yield with a transfer temperature of about 500° F. to near a theoretical yield when the preheating bath is held at 1030° F.

Although the yield of alkylate rises regularly through the entire range of preheat temperatures studied, the quality of the alkylate does not follow exactly the same course. As the temperature rises from 500° F. to 800° F. the yield rises and the quality of the alkylate improves at the same time. The percentage of hexanes in the alkylate increases and the diisopropyl content of the alkylate increases. At some point above 800° F. extensive secondary reactions begin to occur. The yield of alkylate continues to increase with rising preheat temperature but the content of hexanes (and diisopropyl) decreases and the content of octanes increases.

At higher charge temperatures the ethylene is all converted to alkylate, ethyl fluoride, or other fluorides. At low transfer temperatures there is definite evidence that some ethylene remains unconverted. The ethyl fluoride content of the product passes through a maximum as the transfer temperature is raised. At low temperatures the amount of ethyl fluoride is low because ethylene remains unconverted. At high temperatures the amount is low because alkylation is very extensive. At charge temperatures of 600–800° F., the ethyl fluoride content of the product of a single pass is at a maximum.

The above generalizations are borne out by representative runs reported herein as Examples 1 to 6, inclusive.

Other trends are typified by Examples 7 to 11, inclusive, wherein charge temperature approaches constancy and the tower temperature varies. With a charge temperature of about 800° F., the yield of alkylate reaches a maximum at a tower temperature of 150° F. At 125° the yield is slightly lower and at 100° very little alkylate is formed. At 175° and 200° yields slightly lower than those observed at 150° F. are obtained.

When the preheat temperature is 800° F. and the tower temperature is varied, the quality of the alkylate approximately parallels the yield. The best alkylates are obtained when largest amounts are produced. Thus, the percentage of hexanes in the alkylate is at a maximum when a tower temperature of 150° F. is used. The quality is nearly as good at 175° F. Highest hexane contents are accompanied by highest diisopropyl contents and by lowest octane contents.

When the charge temperature is 800° F. all ethylene is converted to alkylate, ethyl fluoride, or other fluorides unless the tower temperature is low. At a tower temperature of 125° F. some unconverted ethylene was detected and the amount increased at 100° F. The percentage of ethyl fluoride appearing in the product is low at low tower temperatures (ethylene remains unconverted) and is high over the remainder of the range.

It may be stated, in summary, that, if the tower temperature is held at 150° F. and the preheat temperature is raised, the yield of alkylate increases regularly but the quality reaches a maximum at a charge temperature near 800° F. If the charge temperature is held at 800° F. and the tower temperature is varied, the yield and quality of alkylate both reach maxima at tower temperatures of 150 to 175° F. At these optimum conditions of about 800° F. charge temperature and 150° F. tower temperature a saturated alkylate containing over 50% of diisopropyl is obtained.

The above examples are all directed to isobutane alkylation in order to show the importance of the temperature limitations recited. The invention is applicable to ethylene alkylation of other isoparaffins, for example, isopentane is readily alkylated with ethylene by following the teachings of the invention. Aromatics and other cyclic compounds, either isocyclic or heterocyclic may also be alkylated. The isoparaffin may be supplied as a portion of a mixture. Thus a gasoline fraction may be mixed with ethylene in vapor phase and supplied to the body of hydrogen fluoride under the conditions stated above. This, in effect, is a reforming operation, due to the isomerizing action of the catalyst and alkylation of isoparaffins and cyclic compounds. The olefin need not be pure ethylene, but may be diluted with substantial amounts of other olefins such as propene and butene to yield a composite alkylate.

The fluorine compounds in the alkylate, formed as a by-product of ethylene-isobutane alkylation, boil chiefly in the range from 65° to 75° C. These compounds may be separated from the alkylate by distillation and recycled with fresh charge to convert them to useful hydrocarbons.

The unit which has been described and used has been operated under a pressure sufficient to completely condense all hydrocarbons in the tower. As an alternative, the alkylation zone could be operated at a lower pressure which would maintain some HF in the liquid phase but would permit all or part of the hydrocarbon to escape as gas. In this case escaping gas will be saturated with HF vapor and the mixture may be passed to a condenser to separate acid which then flows back to the alkylation zone.

Although only single stage operations have been specifically described, the invention contemplates use of a plurality of contacting stages in series. The product from one stage may be passed to succeeding stages without change in order to induce alkylation with ethyl fluoride from the first stage, or the product may be fractionated in any suitable manner for successive contacting. Additional olefins can be added at suitable points between stages. There are strong indications that such series contacting, in addition to inducing further alkylation, results in removal of organic fluorides from the product.

The residence time for the process may vary widely. In general, provision should be made to cause the hydrocarbons to remain dispersed in the catalyst for at least about 5 seconds in order to obtain satisfactory yields. Excessively long residence times are disadvantageous in inducing side reactions such as hydrogen transfer and are preferably avoided. However, it appears that good yields may be obtained even though residence times of one or two hours are used. To conserve acid and cut down side reactions, we prefer to limit residence time to a maximum of about 90 seconds.

We claim:

1. A process for the synthesis of valuable hydrocarbon products by alkylation of isoparaffins with ethylene which comprises forming a vapor phase charge mixture containing ethylene and isoparaffin, dispersing said charge mixture as a vapor at a temperature of 400° F. to 1000° F. into a body of liquid hydrogen fluoride maintained at a temperature of about 100° F. to 200° F. under a pressure sufficient to maintain liquid hydrogen fluoride in said body, separating hydrocarbons from hydrogen fluoride and separating valuable synthetic products from the separated hydrocarbons.

2. A process for the synthesis of valuable hydrocarbon products by alkylation of isoparaffins with ethylene which comprises forming a vapor phase charge mixture containing ethylene and isoparaffin, dispersing said charge mixture as a vapor at a temperature of 400° F. to 1000° F. into a body of liquid hydrogen fluoride maintained at a temperature of about 150° F. to about 175° F. under a pressure sufficient to maintain liquid hydrogen fluoride in said body, separating hydrocarbons from hydrogen fluoride and separating valuable synthetic products from the separated hydrocarbons.

3. A process for the synthesis of valuable hydrocarbon products by alkylation of isoparaffins with ethylene which comprises forming a vapor phase charge mixture containing ethylene and isoparaffin, dispersing said charge mixture as a vapor at a temperature of about 800° F. into a body of liquid hydrogen fluoride maintained at a temperature of about 100° F. to about 200° F. under a pressure sufficient to maintain liquid hydrogen fluoride in said body, separating hydrocarbons from hydrogen fluoride and separating valuable synthetic products from the separated hydrocarbons.

4. A process for the synthesis of valuable hydrocarbon products by alkylation of isoparaffins with ethylene which comprises forming a vapor phase charge mixture containing ethylene and isoparaffin, dispersing said charge mixture as a vapor at a temperature of about 800° F. into a body of liquid hydrogen fluoride maintained at a temperature of about 150° F. to about 175° F. under a pressure sufficient to maintain liquid hydrogen fluoride in said body, separating hydrocarbons from hydrogen fluoride and separating valuable synthetic products from the separated hydrocarbons.

5. A process for the synthesis of valuable hydrocarbon products by alkylation of isobutane with ethylene which comprises forming a charge mixture containing ethylene and isobutane, dispersing said charge mixture as a vapor at a temperature of 400° F. to 1000° F. into a body of liquid hydrogen fluoride maintained at a temperature of about 100° F. to about 200° F. under a pressure sufficient to maintain liquid hydrogen fluoride in said body, separating hydrocarbons from hydrogen fluoride and separating valuable synthetic products from the separated hydrocarbons.

6. A process for the synthesis of valuable hydrocarbon products by alkylation of isobutane with ethylene which comprises forming a charge mixture containing ethylene and isobutane, dispersing said charge mixture as a vapor at a temperature of 400° F. to 1000° F. into a body of liquid hydrogen fluoride maintained at a temperature of about 150° F. to about 175° F. under a pressure sufficient to maintain liquid hydrogen fluoride in said body, separating hydrocarbons from hydrogen fluoride and separating valuable synthetic products from the separated hydrocarbons.

7. A process for the synthesis of valuable hydrocarbon products by alkylation of isobutane with ethylene which comprises forming a charge mixture containing ethylene and isobutane, dispersing said charge mixture as a vapor at a temperature of about 800° F. into a body of liquid hydrogen fluoride maintained at a temperature of about 100° F. to about 200° F. under a pressure sufficient to maintain liquid hydrogen fluoride in said body, separating hydrocarbons from hydrogen fluoride and separating valuable synthetic products from the separated hydrocarbons.

8. A process for the synthesis of valuable hydrocarbon products by alkylation of isobutane with ethylene which comprises forming a charge mixture containing ethylene and isobutane, dispersing said charge mixture as a vapor at a temperature of about 800° F. into a body of liquid hydrogen fluoride maintained at a temperature of about 150° F. to about 175° F. under a pressure sufficient to maintain liquid hydrogen fluoride in said body, separating hydrocarbons from hydrogen fluoride and separating valuable synthetic products from the separated hydrocarbons.

ROBERT E. WOODWARD.
WENDELL P. HAWTHORNE.
JACOB R. MEADOW.